(No Model.)  8 Sheets—Sheet 1.

H. C. LELAND.
TYPE DISTRIBUTING MACHINE.

No. 342,916.  Patented June 1, 1886.

Witnesses:
Frank H. Pierpont
Frank E. Hyde

Inventor:
Henry C. Leland
by Albert H. Walker, Attorney

N. PETERS, Photo-Lithographer, Washington, D. C.

(No Model.) 8 Sheets—Sheet 2.

H. C. LELAND.
TYPE DISTRIBUTING MACHINE.

No. 342,916. Patented June 1, 1886.

Witnesses:
Frank H. Pierpont
Frank E. Hyde

Inventor:
Henry C. Leland
by Albert H. Walker, Attorney

N. PETERS, Photo-Lithographer, Washington, D. C.

(No Model.) 8 Sheets—Sheet 3.
H. C. LELAND.
TYPE DISTRIBUTING MACHINE.
No. 342,916. Patented June 1, 1886.
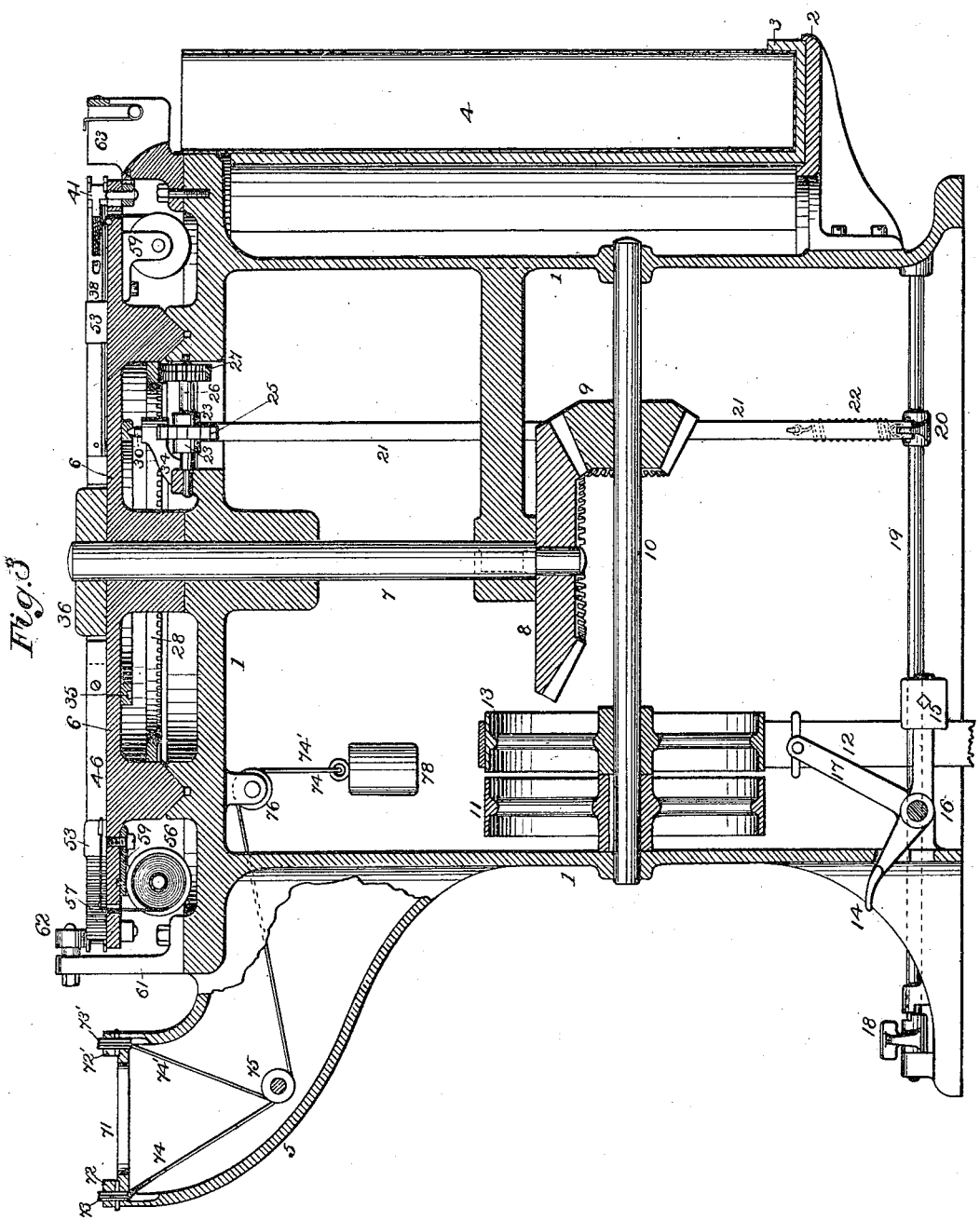

(No Model.)  8 Sheets—Sheet 4.
H. C. LELAND.
TYPE DISTRIBUTING MACHINE.
No. 342,916.  Patented June 1, 1886.
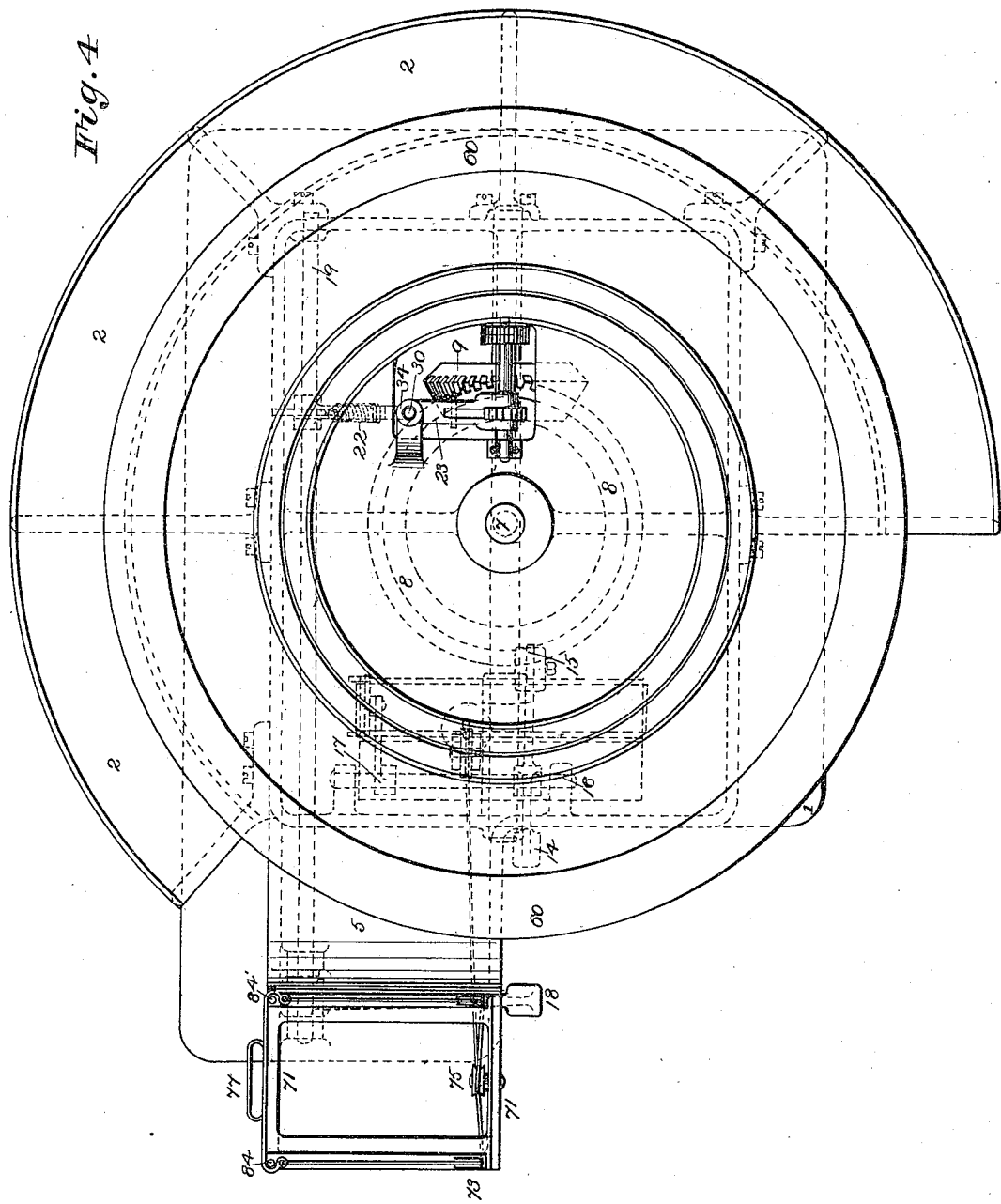
Witnesses:
Frank H. Pierpont
Frank E. Hyde
Inventor:
Henry C. Leland
by Albert H. Walker, Atty.
N. PETERS, Photo-Lithographer, Washington, D. C.

(No Model.) 8 Sheets—Sheet 5.

H. C. LELAND.
TYPE DISTRIBUTING MACHINE.

No. 342,916. Patented June 1, 1886.

Witnesses:
Frank H. Pierpont
Frank E. Hyde

Inventor:
Henry C. Leland
by Albert O. L. Walter, Atty.

N. PETERS, Photo-Lithographer, Washington, D. C.

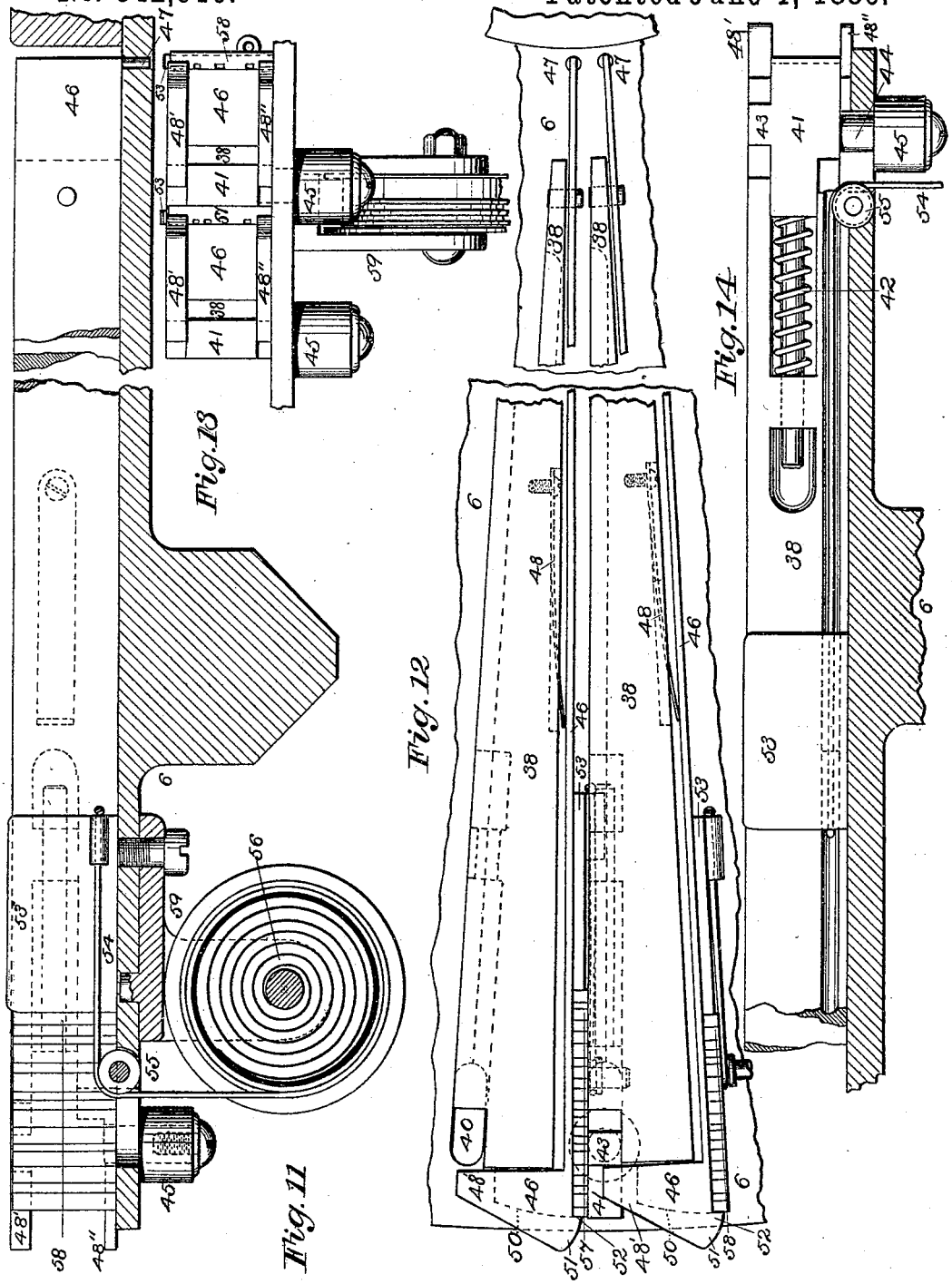

(No Model.) 8 Sheets—Sheet 7.

H. C. LELAND.
TYPE DISTRIBUTING MACHINE.

No. 342,916. Patented June 1, 1886.

Witnesses:
Frank H. Pierpont
Frank E. Hyde

Inventor:
Henry C. Leland
by Albert H. Walker, Atty.

(No Model.) 8 Sheets—Sheet 8.
H. C. LELAND.
TYPE DISTRIBUTING MACHINE.
No. 342,916. Patented June 1, 1886.
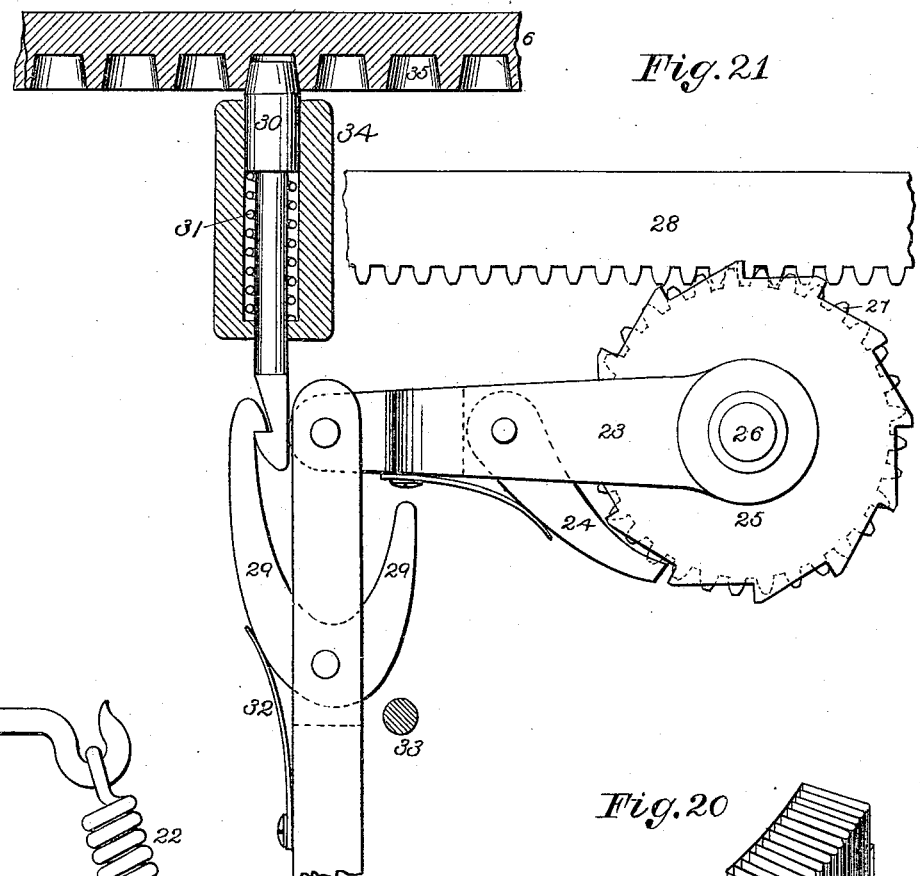
Fig. 21
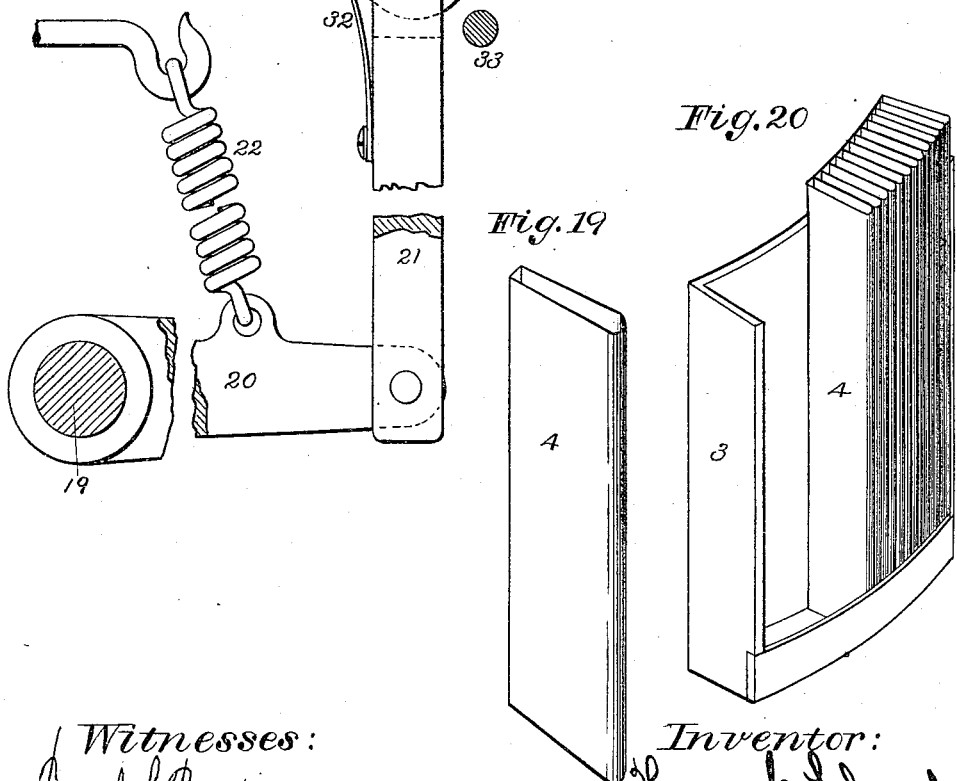
Fig. 20
Fig. 19
Witnesses:
Frank H. Pierpont
Frank E. Hyde
Inventor:
Henry C. Leland
by Albert H. Walker, Attorney
N. PETERS, Photo-Lithographer, Washington, D. C.

UNITED STATES PATENT OFFICE.

HENRY C. LELAND, OF HARTFORD, CONNECTICUT.

TYPE-DISTRIBUTING MACHINE.

SPECIFICATION forming part of Letters Patent No. 342,916, dated June 1, 1886.

Application filed April 16, 1885. Serial No. 162,391. (No model.)

*To all whom it may concern:*

Be it known that I, HENRY C. LELAND, of Hartford, Connecticut, have invented a new and useful Type-Distributing Machine, of which the following description and claims constitute the specification, and which is illustrated by the accompanying eight sheets of drawings.

This machine is adapted to be loaded with type from a galley by an operative, who rapidly presses the lines of type, one after another, into a series of radial channels in the machine, and when being loaded it is adapted to automatically distribute type from already-loaded channels, by means of the intermittent motion incident to loading, and when loaded it is adapted to be run by a steam-engine or other source of rotary motion, and to automatically distribute the type at a high rate of continuous speed.

Figure 1:
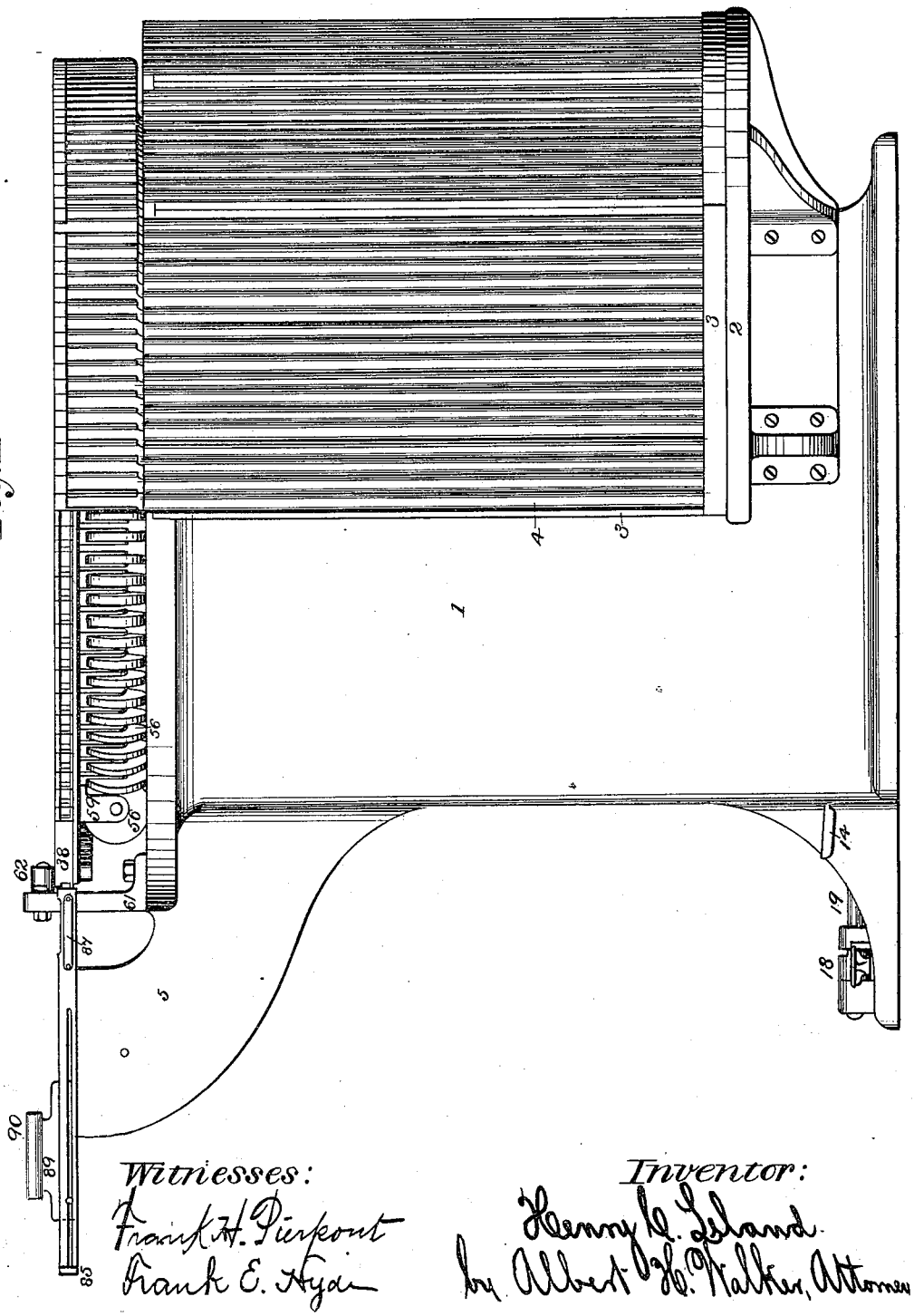
Figure 2:
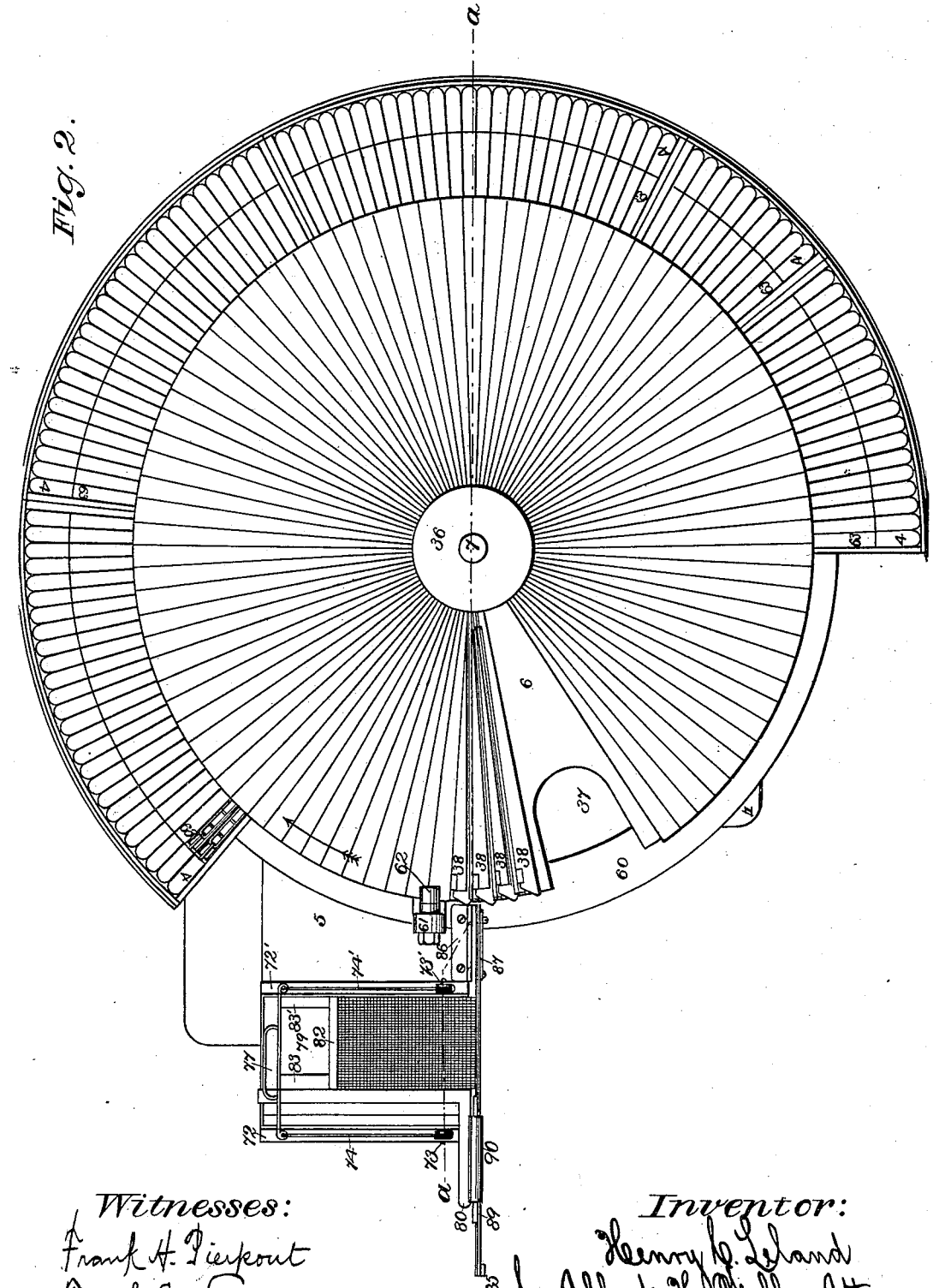
Figure 9:
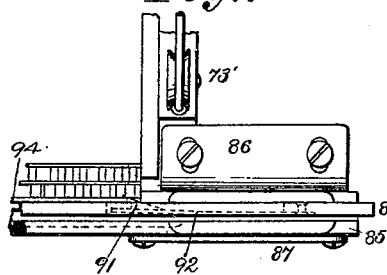
Figure 5:
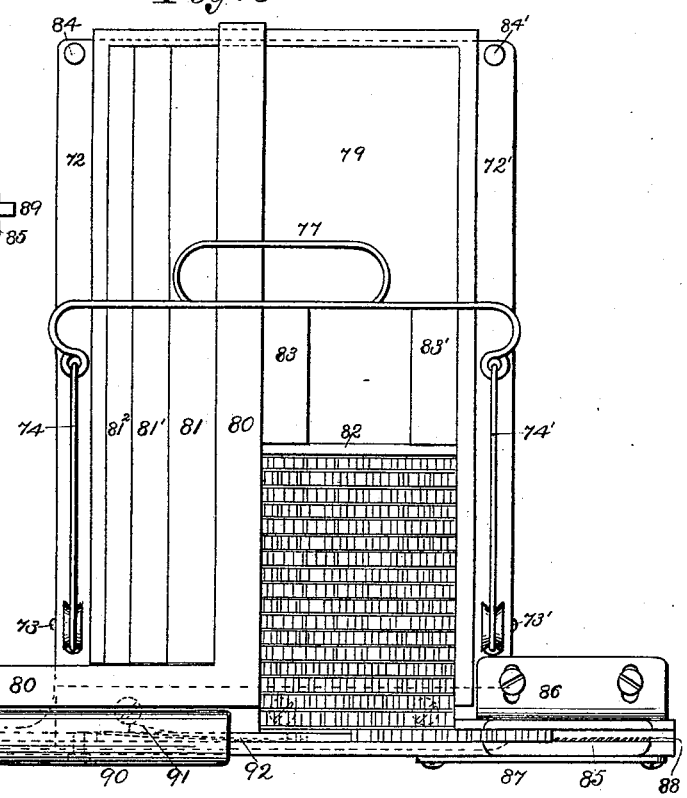
Figure 10:
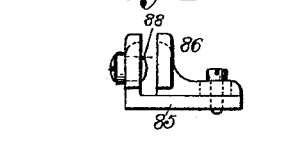
Figure 6:
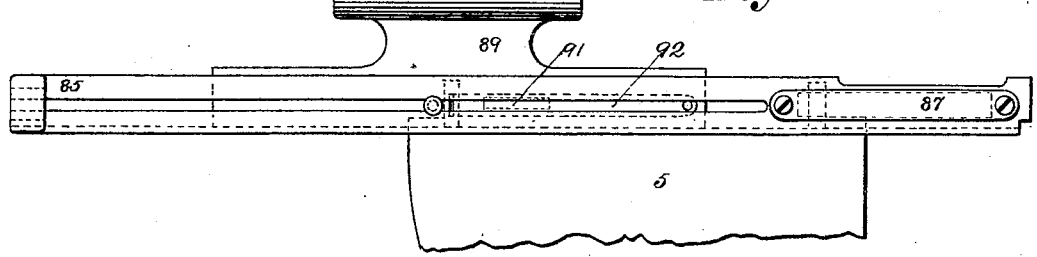
Figure 7:
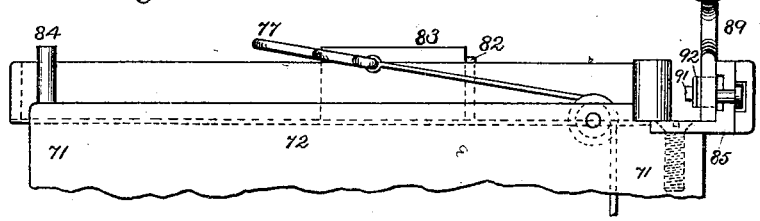
Figure 8:
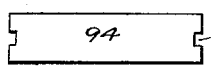
Figure 15:
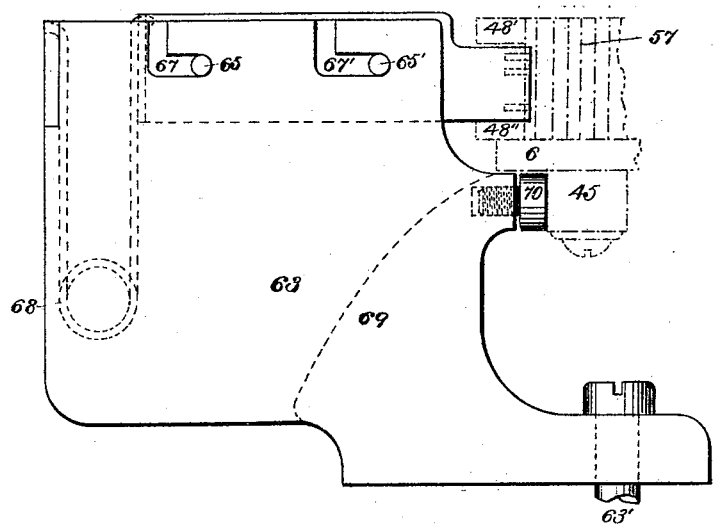
Figure 17:
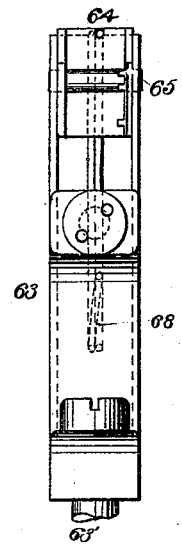
Figure 16:
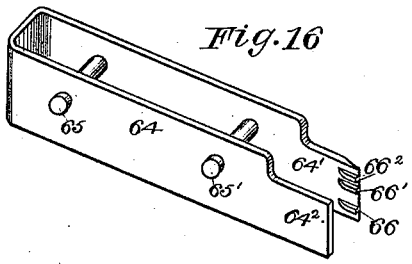
Figure 18:
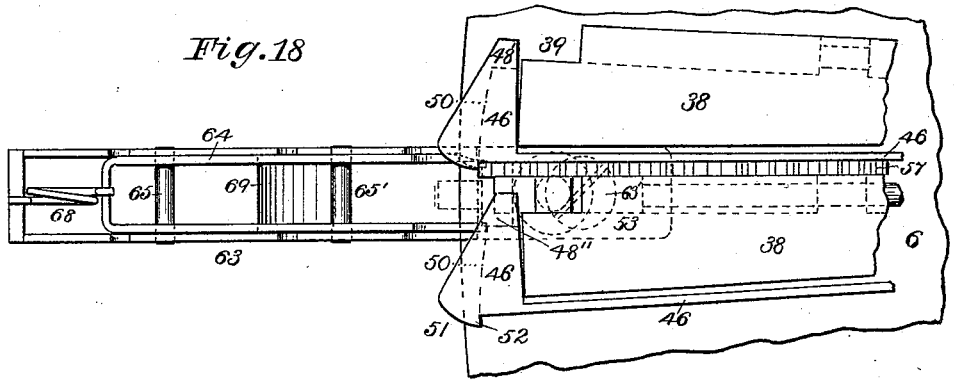

Figure 1 of the drawings is a front elevation of the machine. Fig. 2 is a plan of the same. Fig. 3 is a central vertical cross-section on the line *a a* of Fig. 2. Fig. 4 is a plan of the machine with the revolving table removed, in order to exhibit the parts below. Fig. 5 is a plan of that part of the machine whereon the lines of type are separated from the leads, and from which they are forced into the radial channels. Fig. 6 is front elevation of the same. Fig. 7 is an elevation of the left-hand side of the same. Fig. 8 is a view of one of the leads used in the galleys. Fig. 9 is a view of parts of Fig. 5, but in a different position. Fig. 10 is an elevation of the right-hand end of the parts which project toward the right in Figs. 5 and 9. Fig. 11 is an enlarged view of part of the cross-section shown in Fig. 3. Fig. 12 is a plan of a radial portion of the revolving table. Fig. 13 is an elevation of the left-hand end of what is shown in Fig. 12. Fig. 14 is a fragmentary elevation of the forward side of the rail 38 and dog 41. Fig. 15 is a side elevation of one of a series of distributer-cases separately attached to the frame of the machine, and arranged around the revolving table in the form of a segment of a circle. Fig. 16 is a perspective view of a distributer, one of which works in each distributer-case. Fig. 17 is an elevation of the right-hand end of such distributer-case with such distributer within it. Fig. 18 is a plan view of such distributer-case and such distributer, showing the latter at work upon the first of a line of type in one of the radial channels. Fig. 19 is a perspective view of one of the cups into which the machine distributes type. Fig. 20 is a perspective view of a tray for holding a series of such cups under the distributers, and partly filled with such cups. Fig. 21 is a view of mechanism for revolving the circular table intermittently while it is being loaded with type.

The frame of the machine is indicated in the drawings by the numeral 1. Its general form is shown as that of a covered box. The bracket 2 is bolted to the exterior walls of the frame 1, and its function is to support a series of trays, 3. Each of these trays is in the form of a segment of a circle, and contains a series of cups, 4. The bracket 5 projects from the exterior of the frame 1, near its back left-hand corner, and its function is to support the apparatus which holds the galley, and from which the lines of type are pressed into the radial channels in the revolving table. A circular table, 6, revolves on the top of the frame 1, in the direction indicated by the arrow in Fig. 2, and it is caused to revolve by the shaft 7, gears 8 and 9, shaft 10, fast pulley 11, and belt 12. When the revolving table is to be stopped, the belt is shifted to the loose pulley 13 by the treadle 14, being released from a detaining-notch in the frame 1, so as to enable the weight 15, through the shaft 16 and arm 17, to carry the belt to the right, as shown in Fig. 3. When the revolving table is stopped from continuous revolution, and is to be revolved intermittently in order to enable its radial channels to be filled with type from the galley, it is so revolved by means of the treadle 18, working the shaft 19, the arm 20, and the rod 21, against the action of the spring 22. The rod 21 thus works the arm 23, the dog 24, the ratchet 25, keyed to the shaft 26, and thus the gear 27, and that gear works the annular rack 28, which rack is fastened to the lower side of the revolving table 6, concentric with the axis of the latter. The rod 21, through the catch 29, also operates the dog 30 against the action of the spring 31, that catch being forced into engagement with the dog by the spring 32, and out of engagement with the same by the pin 33, which pin is rigidly connected to the frame 1. The dog 30 works in a proper chamber in the bracket 34, and successively enters a series of recesses, 35, in the lower surface of the revolving table 6, which recesses are arranged in a circle concentric with the axis of that table. The upper side of the revolving table is a plain level surface throughout, except that a collar, 36, may surround the upper end of the shaft 7, and its periphery is a true circle, except that the recess 37 is cut into it radially at one place, in order to give easy access to the distributers when that recess passes them, one after another, during the revolutions of the table. A series of wedge-shaped rails, 38, are fastened down radially upon the revolving table 6, about one-fourth of an inch apart, and throughout all of its surface, except a few degrees adjacent to the recess 37. A few of these rails 38 are represented in Fig. 2, and the places for the residue are indicated by the long wedge-shaped radial spaces in that figure. Each of those spaces is furnished with one of the rails 38 and with its appurtenances, to understand the construction of all of which attention may be directed to the detailed drawings of Figs. 11, 12, 13, 14, and 18. In Figs. 12 and 18 two adjacent rails 38 are shown at full size. Each of them has the quadrangular recess 39 cut away from its forward outer corner, as shown in Fig. 18. Under that recess, and also partly under the inwardly-adjacent portion of the rail 38, the slot 40 is cut through the table, as shown in Fig. 12. The sliding dog 41 is fitted in a longitudinal recess on the forward side of the rail 38, so as to reciprocate lengthwise of that recess against the resistance or under the action of the spring 42. The upward projection 43 of the dog 41 reciprocates in the recess 39, while the downward projection 44 of the dog reciprocates in the recess 40, and is provided below the latter with the roller 45, or with a cam performing the same function, as hereinafter explained. In the rear of each rail 38, and between it and the next following rail 38, the oscillating rail 46 turns within narrow limits upon the pivot 47, under the action or against the resistance of the spring 48. The rail 46 is a flat piece of metal as wide as the rail 38 is high, and it extends from the pivot 47 to the outer end of the rail 38, where it terminates in a projection, 46, extending over the extreme outer end of the rail 38, and provided with the upper and lower wings, 48' and 48''. The wing 48' is exactly over the wing 48'', and like it is provided with the inclined edge 51, leading to the point of the right-angled hook-like shoulder 52.

The projection 46, between its two wings 48' and 48'', presents the inclined surface shown in elevation in Fig. 13, and indicated in plan view by the dotted line 50 in Fig. 12. A shallow recess is cut into the vertical corner of the rail 46, adjacent to the nicked edge of the outer type, in the channel of which that rail constitutes one side, in order to give abundant entrance to the wing of the distributer, as hereinafter set forth. At the rear of each rail 46, and between it and the next following rail 38 is the follower 53. This is a flat piece of metal similar in width to the rail 46. It is forced toward the outer end of the radial channel between the rails 38 and 46 by means of the cord 54, drawn over the pulley 55 by the coiled spring 56. The space between the rear of each rail 46 and the front of each rail 38 and dog 41, and forward of the outer end of the follower between the two rails, is a radial type-channel, and a line of type is shown in such a channel in Figs. 12 and 18, and is marked 57. A second line of type is also shown in Fig. 12, and is marked 58 in that figure and in Fig. 11; but the rail 38 and the dog 41 are not in that instance represented in the drawings. The line of type in each type-channel is held on its forward side by the adjacent rail 46, and on its rear side by the adjacent rail 38 and dog 41, and at its inner end by the adjacent follower 53, and at its outer end by the shoulders 52 on the wings 48' and 48'', respectively, of the adjacent rail 46. Those shoulders extend about half-way across the side of the outer type in the line, as shown in Figs. 13 and 18. Each follower has its own spring 56, and a number of such springs are shown in Fig. 1, inclosed in a proper case for each of them, and with each case supported by a bracket, 59, attached to the lower side of the revolving table 6. The outer border, 60, of the top of the table 6 is a level annular surface. Fastened to it at one point is the bracket 61, carrying the roller 62, the function of which roller is to press downward into its radial channel any type which may become slightly elevated therein. A series of distributer-cases, one of which is shown in Figs. 15, 17, and 18, and is marked 63, and is provided with a bolt, 63', are also fastened by their bolts to the border 60, in the form of a segment of a circle, as shown in Fig. 2. Each of these distributer-cases is on a radial line with the axis of the revolving table 6, and is provided with a distributer, 64. Two of them are shown in Fig. 2 as being thus provided, and all, in imagination, may be so considered. The distributer is shown in Fig. 16 as consisting of a flat piece of metal bent into the shape of a long letter U with parallel sides, the two sides being fastened together by two pins, 65 and 65', passing through both, and constituting two projections from each side of the distributer. The inner border of the wing 64' of the distributer is provided with the three feelers 66 66' 66², arranged in position to correspond with the feeler-nicks to be made in the particular kind of type to be extracted from the type-channels of the revolving table 6 by that distributer. Each distributer is placed in its case by passing its pins into the right-angled slits 67 and 67', which are made in each wall of the case for their reception, and which are of such horizontal extent as to limit the inward motion of the distributer to the thickness of the particular type upon which it operates. Behind each distributer and within its case the spring 68 is located, so as to force the distributer toward the axis of the revolving table 6. Each distributer-case is also provided with the partition 69, along the upper surface of which the type fall from the distributer into the cup immediately below. The set-screw 70 is also fitted horizontally into the distributer-case, and acts as an adjustable cam to force the roller 45 or its equivalent cam to carry back the dog 41 into its recess in the rail 38 against the action of the spring 42. The bracket 5 terminates in the quadrangular open frame 71, the side pieces, 72 72', of which are higher than the end pieces. Fitted in those side pieces are the pulleys 73 and 73', respectively. Two cords, 74 and 74', pass over those pulleys, respectively, and thence under the pulley 75 and over the pulley 76, and are attached at their upper ends to the bail 77, and at their lower ends to the weight 78. A galley-tray, 79, containing a galley of type, is placed on the frame 71, fitting between its elevated sides 72 and 72'. The galley of type is placed on the right-hand side of the galley-tray, if not wide enough to fill the whole tray, and it is blocked there by the square 80 and as many other pieces of wood or metal, 81 81' 81², as are required. A block, 82, presses against the head of the galley, and the blocks 83 and 83' are placed between the block 82 and the bail 77. When the bail is not in use, it may be hooked over the pins 84 and 84'. The grooved rail 85 is fastened to the front end piece of the frame 71, and the adjustable rail 86 is fastened to the base of the right-hand end of the rail 85, as shown in Fig. 10, leaving a channel between the two rails wide enough for the passage of a line of type. A strap, 87, provided on its inner surface with a series of scale-like springs, 88, is fastened over a horizontal opening through the right-hand end of the rail 85. The function of the scale-like springs is to press the type in the channel between the rails 85 and 86 against the latter rail during their passage through the channel with sufficient force to allow one of the type to be withdrawn by the operative without disturbing the other type in the channel. The plunger 89 is worked by the handle 90 forward and backward on the grooved rail 85. During its forward stroke it forces the first line of type in the galley into the channel between the rails 85 and 86, and during its backward stroke it forces the adjacent lead back and away from the galley and into a proper receptacle below by means of the lug 91 on the spring 92. That spring is fastened at its forward end to the plunger 89, and it works in a recess cut through the plunger. During the forward stroke of the plunger the spring is forced into its recess by the action of the side of the adjacent lead upon the long inclined forward surface of the lug 91; but when the point of the lug reaches the notch 93 in the right-hand end of the lead 94, which it does at the instant the plunger reaches the right-hand limit of its stroke in the groove of the rail 85, the lug 91 enters the notch 93 and afterward forces the lead back with the backward movement of the plunger. When the galley is not a leaded one, the spring 92, with the lug 91, may be removed; or, if they are used, they will be inoperative, because in that case the lug finds no notch to enter, and therefore rides backward along the adjacent line of type.

The mode of operation of this machine is as follows: The galley of type for distribution being placed as shown in Fig. 2, and the belt 12 being on the loose pulley 13, and the dog 30 being in one of the recesses 35, the table 6 will be at rest in such a position that one of its radial type channels is on a line with the channel between the rails 85 and 86, and so that the extreme right-hand end of the rail 85 is almost in contact with the adjacent end of the dog 41. Then the operative forces the plunger 89 to the right-hand limit of its stroke, and in so doing he forces the first line of the galley of type shown in Fig. 2 into the channels between the rails 85 and 86, as shown in Fig. 5, and thence into the adjacent radial channel. When the advanced end of that line of type reaches the inclined edges 51 of the wings 48' and 48'', it forces them and the rail 46 sidewise against the action of the spring 48 and toward the rail 38, and thus makes room for the entrance of the line of type into the radial type-channel, which, as it proceeds, forces the follower 53 back toward the axis of the table 6 against the action of the spring 56. When the plunger is withdrawn toward the left of its stroke, it allows the rail 46 to be forced by the spring 48 to the position shown in Fig. 12, so that the shoulders 52 of the wings 48' and 48'' prevent the follower 53 from forcing the line of type out of the radial channel. During the backward stroke of the plunger 89 the adjacent lead in the galley is forced backward by means of the engagement of the lug 91 on the spring 92 with the notch 93 in the lead 94. Then the operative again forces the plunger forward, and thus again forces a line of type into the same radial channel as before, and thus forces the first line still farther inward against the follower 53. The operative continues to repeat these operations till the follower 53 is forced back to the inner end of its channel, and that channel is thus fully loaded with type. In the meantime the galley has been fed forward to the plunger by means of the weight 78 operating on the cords 74 74' and the bail 77. The revolving table is then turned forward so as to bring the next following radial channel in a line with the channel between the rails 85 and 86, and is locked in that position pending the loading of that channel in the same way as the other one was loaded. This turning forward, stopping, and locking is accomplished by the operative depressing the treadle 18. That movement causes the rod 21 to draw the dog 30 out of the socket 35, in which it has been held by the spring 31, and also causes that rod to revolve the ratchet 25 a distance corresponding to that between two of its teeth. The latter revolution operates, through the shaft 26, the gear 27, and the rack 28, to revolve the table 6 just far enough for the purpose in view. Thereupon the shorter arm of the catch 29 collides with the pin 33, and is thus thrown out of engagement with the dog 30, and that dog is therefore forced by the spring 31 into the next following socket 35. Then the operative fills the presented radial channel with type in the same way that he filled its predecessor, and having done so he again depresses the treadle 18, and proceeds as before till all the radial channels are filled with type, and the machine thus fully loaded. While the latter part of this loading is going forward, the already-loaded channels are being operated upon by the distributers, whenever an intermittent motion of the table occurs, in substantially the same way that they are afterward operated upon by the continuous motion of the table, as hereinafter explained.

The machine is started at distributing its type by the operative depressing the treadle 18 and passing it to the right, so that its shouldered hub will engage with the adjacent shouldered bearing, (indicated in Fig. 3,) and then depressing the treadle 14 and passing it under a convenient shoulder to hold it down, and thus shifting the belt from the loose pulley 13 to the fixed pulley 11. The direction and the speed of the motion of the belt are such that the table 6 is revolved in the direction of the arrow in Fig. 2 at the rate of three or more times per minute. The distributer-cases 63 are provided with distributers 64 at least as numerous as the kinds of combinations of nicks in the type in the radial channels, and each distributer is provided with a combination of feelers corresponding in number, size, and position with the feeler-nicks on the forward edges of one only of those kinds of type. Examples of two such combinations of feeler-nicks are shown at 57 and 58 in Fig. 13. Each of the distributers will therefore act upon one kind of type only as the different lines of type in the different radial channels pass in review before it. When the outer type of those in a particular channel reaches the distributer, which is furnished with feelers to correspond with the nicks in that type, that distributer extracts that type from that channel and drops it into the cup below. The mode of operation by which this is done is illustrated by Figs. 11 to 18, inclusive. Fig. 15 shows that the wings 48' of the distributers pass between the wings 48' and 48" of each of the rails 46, as the outer ends of these rails are, one after another, carried past each distributer in succession by the revolution of the table 6 in the direction of the arrow in Fig. 2. The angular slits 67 and 67' in the side walls of the distributer-case 63 are of such a horizontal extent that the utmost inward movement of the distributer 64 carries its wing $64^2$ into contact with the forward border of the inclined surface 50 of the rail 46. As the table continues to revolve, that inclined surface forces the distributer gently backward against the resistance of the spring 68, till the wing $64^2$ rides over the presented surface of the outer type in the radial channel, which surface is on a line with the rear border of the inclined surface 50. Then when the wing 64' of the distributer reaches the outer type, its feelers, if they correspond with the feeler-nicks in that type, are forced to enter these nicks by the spring 68, and the sharp presented edge of the wing 64' is also forced to enter between the forward edge of the type and the adjacent recessed corner of the rail 46. At the same instant the protuberance 70 forces the roller 45 or its equivalent cam and the dog 41 back toward the axis of the table 6, just far enough to allow the outer type in the channel to be arrested by the wing 64' without impeding the revolution of the table 6. In being arrested the outer type is forced out of the radial channel past the face of the dog 41, and away from being held between the shoulders 52 of the wings 48' and 48" on the one side and the next type in the channel on the other. Thus released, the type falls between the two wings of the distributer, and thence down upon the partition 69, and thence into the cup below. The instant it is thus taken out of the channel the follower 53 forces the whole of the remaining type in the channel forward a distance corresponding with the space occupied by the type removed. When the outer type of those in a particular channel reaches a distributer furnished with feelers which do not correspond with the feeler-nicks in that type, both wings of that distributer ride over the presented surface of that type without injuring it or moving it from its place in the channel.

The distributers may be transposed in their cases at will; or several sets of distributers, to distribute different fonts of type, may be used in the same set of distributer-cases, care being taken to so adjust the set-screw 70 in each distributer-case that it will force the roller 45 or its equivalent cam, and thus the dog 41, back just far enough to allow the egress of type of the thickness of that to be distributed by the distributer in that case for the time being. The type in the radial channels continues to be distributed by the various distributers arranged around the revolving table as long as the table continues to revolve and the type remains unexhausted in any of the channels. When the type is exhausted in any one channel, the outer end of its follower 53 is presented to the distributers, and as it has no feeler-nicks to give entrance to any distributer they all ride harmlessly over it.

In that specimen of my machine which I have constructed and used I do not find any evil to result from the slight friction involved in the passage of the wings 64' and 64² along the surfaces 50 on the ends of the rails 46; but if that friction is desired or required to be avoided that result may be obtained by using rollers to force the distributers outward in substantially the same way that the rollers 45 force the dogs 41 inward.

The various radial channels have no joint operation, and therefore no particular number of them are required. The more numerous they are, the more type will be distributed at each revolution of the table 6. Nor do the various distributers have any joint operation among themselves, but they are at least as numerous as the varieties of combinations of feeler-nicks in the type to be distributed. Additional distributers may be used for type of frequent occurrence in a galley, so that such a type, when it happens to be at the outer end of a particular channel, may speedily find a distributer to extract it therefrom.

My machine may be run by the hand of the operative turning a crank extending upward from the shaft 7, and other forms of apparatus may be used to revolve it intermittently, or it may be so revolved by hand; and it may be loaded in other ways than that I have described. So, also, the type-channels may be parallel, instead of radial, and the distributers arranged in a straight rank, instead of in an arc of a circle. In such a case the ends of the type-channels would be carried past the wings of the distributers, or the wings of the distributers be carried past the ends of the type-channels, by a rectilinear motion.

I claim as my invention—

1. The distributer 64, having the penetrating-wing 64', provided with feelers, substantially as described.

2. The rail 46, having the inclined surface 50 at the outer end of its body, and having the wings 48' and 48'', projecting horizontally therefrom, and each of those wings having the inclined edge 51 and the shoulder 52, all substantially as described.

3. The combination of the rail 38, the dog 41, the spring 42, the rail 46, and the follower 53, all substantially as described.

4. The combination of the rail 38, the dog 41, the spring 42, the rail 46, the follower 53, and the distributer 64, all substantially as described.

5. A series of channels, each adapted to hold a line of variously-nicked type pressed toward the exits of the channels by springs, in combination with a series of type-distributers provided with variously-arranged feelers to correspond with the variously-nicked type, respectively, and pressed toward those type by springs, and in combination with mechanism, substantially as described, to move one series past the other, so that the distributers will remove the type from the channels in a direction substantially at right angles to the longitudinal direction of those channels, all substantially as described.

HENRY C. LELAND.

Witnesses:
   ALBERT H. WALKER,
   FRANK H. PIERPONT.